United States Patent [19]

Heck

[11] Patent Number: 4,474,095
[45] Date of Patent: Oct. 2, 1984

[54] NIBBLING MACHINE

[76] Inventor: Philip H. Heck, 26727 W. Seven Mi., Redford, Mich. 48240

[21] Appl. No.: 458,755

[22] Filed: Jan. 17, 1983

[51] Int. Cl.³ .................... B23D 21/02; B23D 27/00
[52] U.S. Cl. ........................................ 83/188; 83/54; 83/442; 83/565
[58] Field of Search ................ 83/442, 916, 565, 188, 83/54; 30/92, 92.5

[56] References Cited

U.S. PATENT DOCUMENTS

| | | | |
|---|---|---|---|
| 364,262 | 6/1887 | Kittredge | 83/442 X |
| 1,582,052 | 4/1962 | Klages | 83/916 X |
| 1,782,420 | 11/1930 | Gray | 83/916 X |
| 2,335,720 | 11/1943 | Yeomans | 83/916 X |
| 2,650,663 | 9/1953 | Wales et al. | 83/916 X |
| 3,069,770 | 12/1962 | Ferris | 83/916 X |
| 3,266,356 | 8/1966 | Seravin | 83/916 X |

FOREIGN PATENT DOCUMENTS 706523  6/1931  France .................... 83/442

Primary Examiner—James M. Meister
Attorney, Agent, or Firm—Charles W. Chandler

[57] ABSTRACT

A machine for nibbling sheet metal such that its edge conforms to the outline of a template held in face-to-face contact with the workpiece. A punch is slideably mounted in a cylindrical die so as to be movable to a position in which a notch in the punch, and the die form an adjustable opening for receiving the sheet metal as the template edge engages the side of the punch. The punch is reciprocated in excess of several cycles per second to progressively nibble crescent shaped sections from the edge of the workpiece until it conforms to the template edge. In a second version, the die has a slot for receiving the edge of the sheet metal as it is being nibbled so that the sheet metal and template do not buckle. Another form of the nibbling machine is employed to shape the end of a tubular workpiece mounted on an elongated anvil.

5 Claims, 5 Drawing Figures

NIBBLING MACHINE

BACKGROUND OF THE INVENTION

This invention is related to nibbling machines which follow the outline of a template to progressively nibble away the edge of a sheet metal workpiece until it conforms to the template edge, and more particularly to a nibbling machine in which the template is clamped in surface-to-surface contact with the sheet metal workpiece such that the template edge slideably engages the side of the punch as it is being reciprocated in the die.

Several commercially available machines employ a punch that is reciprocated at the rate of several strokes per second to nibble away the edge of a sheet metal workpiece until it corresponds to the outline of a template. Usually the template is supported above the workpiece. However, in some applications the template is clamped to the workpiece. In the latter applications, the die is supported on a base while the punch and the drive motor are mounted on a "C" shaped frame above the die. The "C" shaped frame limits the type of work that can be cut to that which can be received in the throat between the upper and lower frame arms. For example, if the workpiece has a turned-up edge having a dimension greater than the height of the throat, it is difficult to engage the workpiece with the punch.

SUMMARY OF THE INVENTION

The broad purpose of the present invention is to provide an improved nibbling machine for following the profile of a template to shape sheet metal, in which the punch is driven by a motor mounted beneath the die. The punch has a notch which cooperates with the die to form an adjustable opening for receiving the edge of a workpiece clamped to the template.

Another object of the invention is to provide a nibbling machine for shaping the end of a tubular workpiece according to the shape of a template mounted on the workpiece.

Another object is to provide a nibbling machine in which the punch is received in an opening in the side of an elongated anvil for shaping either a flat or a tubular workpiece.

Another advantage of the invention is that the template need not be made of metal but can be easily formed of a plastic or even heavy cardboard, in some cases simply requiring the user to trace over a drawing on plastic and then either scoring it with a sharp scriber or cutting the pattern with scissors.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
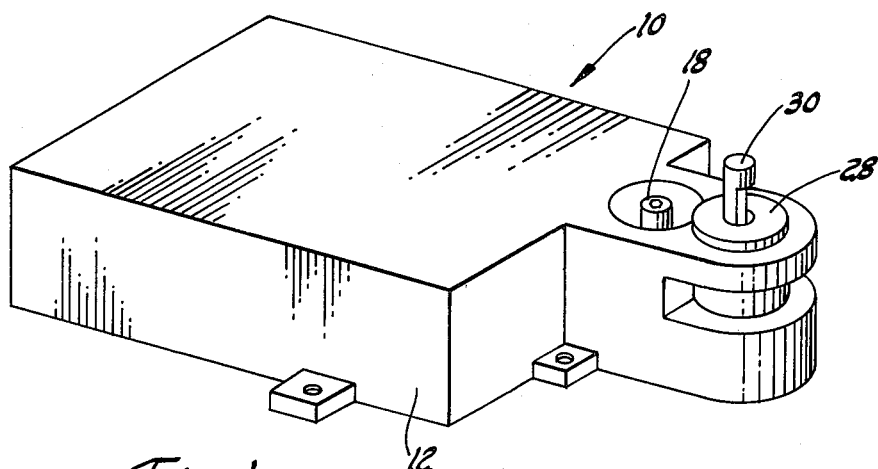
FIG. 1 is a perspective view of a nibbling machine illustrating the preferred embodiment of the invention.
Figure 2:
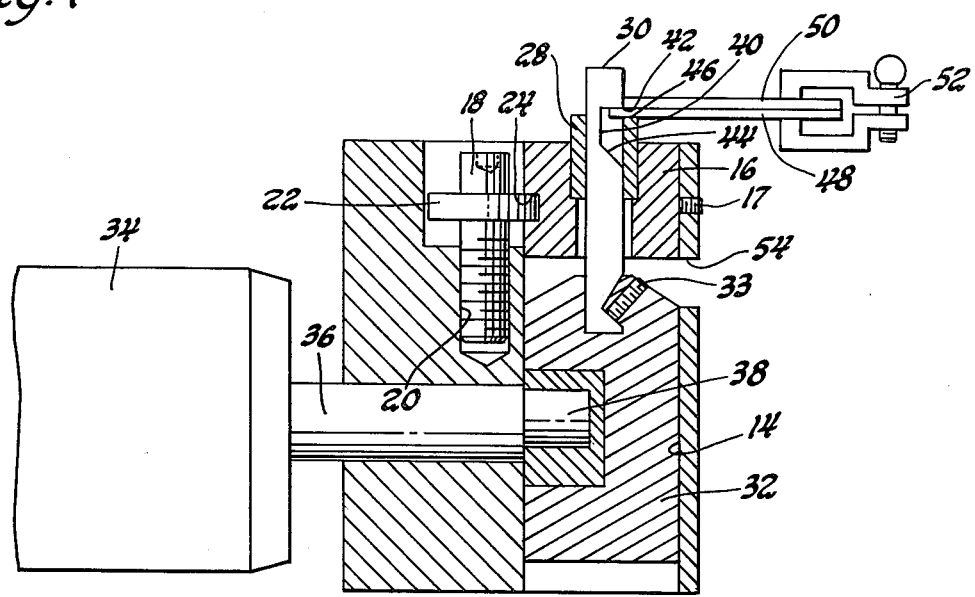
FIG. 2 is an enlarged sectional view through the machine of FIG. 1.

Referring to the drawings, a preferred nibbling machine is illustrated in FIG. 1 at 10, and comprises a base 12. The base has a vertical opening 14, as best illustrated in FIG. 2. A generally cylindrical die support 16 is slideably mounted in the upper end of opening 14. Set screw 17 locks the die support to the base.

Adjusting member 18 is mounted on the base adjacent opening 14. The lower end of adjusting member 18 is threadably mounted at 20 so collar 22 can be vertically adjusted. Collar 22 is carried by the adjusting member and engaged in slot 24 of die support 16 in such a manner that as the adjusting member is raised or lowered, the upper end of the support is adjusted with respect to the top surface of the base.

Support 16 has an opening 26. A cylindrical die 28 is carried at the upper end of opening 26. An elongated punch 30 is slideably mounted in die 28.

An actuator member 32 is slideably mounted in opening 14 and connected to the lower end of punch 30. Set screw 33 locks the punch to the actuator.

Drive means 34 carries rotatable shaft 36. An eccentric drive element 38 is carried at the outer end of shaft 36 and connected to the actuator member in such a manner that as the shaft is rotated, actuator member 32 is vertically reciprocated in opening 14 at a rate of several oscillations per second. The preferred drive means oscillates the punch at a rate of 1750 strokes per minute.

Punch 30 has a notch 40. The upper end of the notch forms a cutting edge 42. The bottom edge of the notch, at 44, is sloped toward the bottom of die 28.

The top edge of the die opening forms a lower cutting edge 46. The arrangement is such that as the punch cutting edge is raised to a position above the die, an opening is formed for receiving workpiece 48 into notch 40. Template 50 is mounted in surface-to-surface contact with the workpiece. Clamping means 52 hold the template and workpiece together.

The punch is raised a sufficient distance to receive the workpiece but not the template into the notch. The edge of the template engages the top of the punch as illustrated in FIG. 2. When drive means 34 pulls the punch down, the two opposed cutting edges shear a crescent-shaped section from the workpiece. The punch then proceeds downwardly to a position in which the sheared off section drops through the bottom of opening 26 and passes through opening 54 in the base. This process is repeated several cycles a second so that as the user advances the workpiece and the template, the punch nibbles the edge of the workpiece to progressively from a profile that corresponds to the template edge.

In this arrangement the workpiece configuration does not limit the utility of the preferred punching machine because there is no "C" shaped frame supporting the punch and the die. The punch is driven from a motor mounted beneath the die, rather than above.

Figure 3:
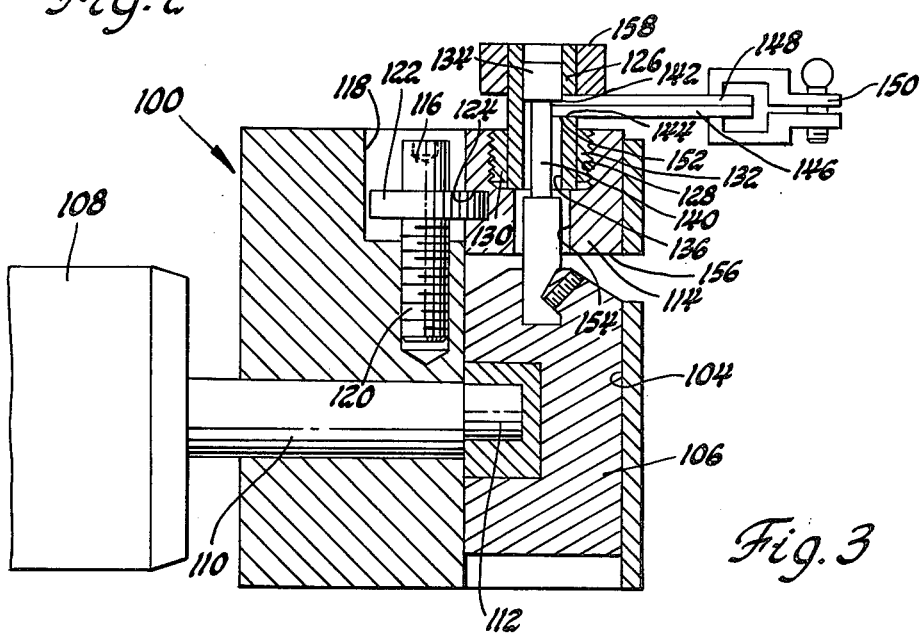
FIG. 3 is a sectional view through another embodiment of the invention.

Referring to FIG. 3, another embodiment 100 of the invention is illustrated and comprises a base 102 having an opening 104 for an actuator 106. Drive means 108 has a shaft 110 carrying eccentric 112 which oscillates the actuator in a vertical motion as the shaft is being rotated.

A die support 114 is slideably mounted in the upper end of opening 104. An adjusting member 116 is mounted in opening 118 and connected by the threaded means 120 to the base. An annular shoulder 122, carried on the adjustment member, is received in opening 124 of the die support, to adjust the vertical position of the die support.

A cylindirical die 126 has its lower end seated in opening 128 of the die support. Die 126 has a collar 130. A bushing 132 is threadably mounted in opening 128 to lock the die in position.

An elongated punch 134 is slideably mounted in central opening 136 of the die. Actuator 106 is connected to the lower end of punch 134 so that as the drive means rotates eccentric 112, the punch is oscillated several cycles per second.

The punch has an annular notch 140 forming an upper cutting edge 142. The die has an opening 144 for receiving both workpiece 146 and template 148. Clamping means 150 support both the workpiece and the template in surface-to-surface contact. The lower edge of die opening 142 forms a cutting edge 152.

Opening 144 has a sufficient height to accommodate the thickness of both the workpiece and the template. The motion of the punch is such that it is raised above die cutting edge 152 a sufficient distance to receive the workpiece, but an insufficient distance to receive the template. The template slideably engages the side of the punch as the workpiece is received into the die notch between the upper and lower cutting edges. The punch is lowered in each cutting cycle to shear off the edge of the workpiece. The sheared-off section drops down through opening 136, down opening 154 and then out through a discharge opening 156.

A split collar 158 is mounted on the upper end of the die to engage the template to prevent the workpiece and template from chattering.

The user advances both the template and the workpiece so that the punch progressively nibbles the workpiece until its profile corresponds to that of the template.

Figure 4:
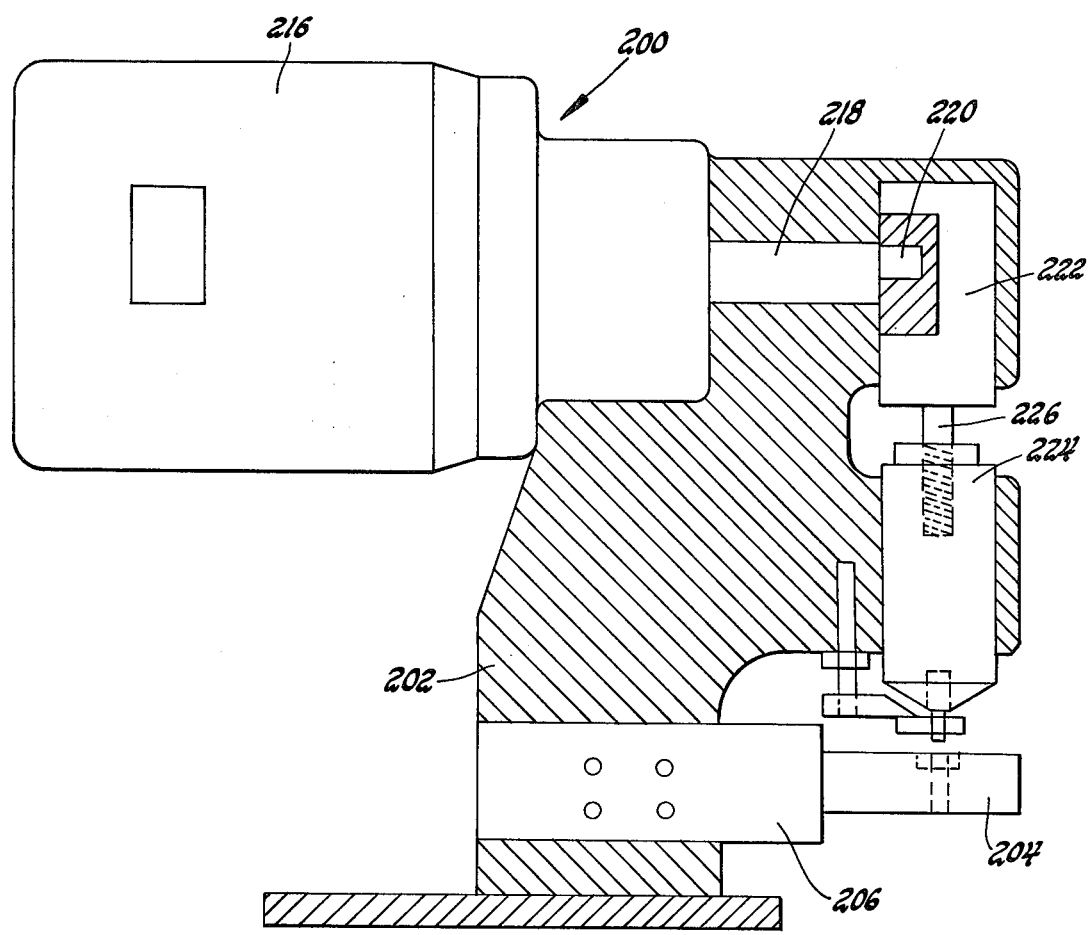
FIG. 4 is a sectional view through a machine employed for nibbling the end of a tubular workpiece.
Figure 5:
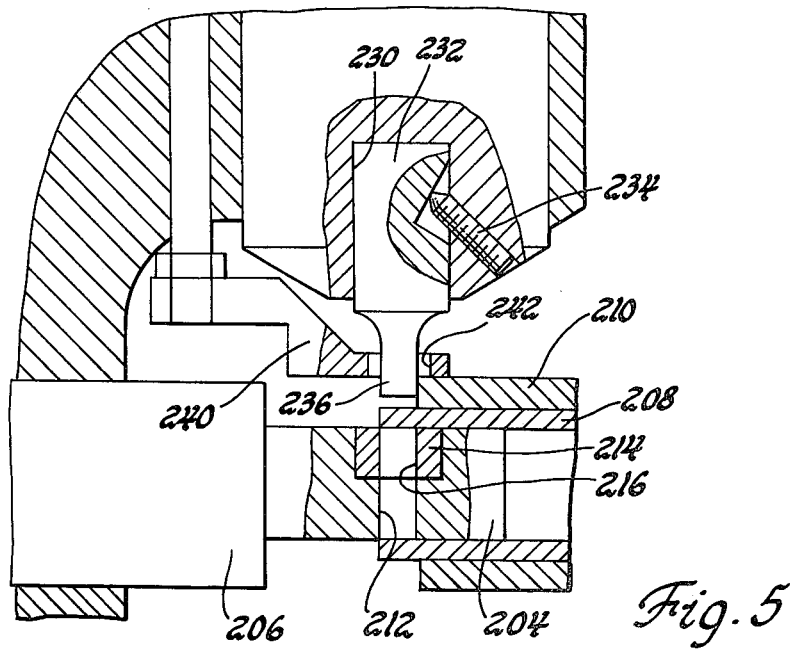
FIG. 5 is an enlarged view showing a tubular workpiece and template mounted on the anvil of FIG. 4.

Referring to FIGS. 4 and 5, a tube shaping nibbling machine, indicated at 200, includes a base 202. An anvil 204 having body 206, is releasibly mounted on the base. The outer end of the anvil has a circular cross section. The diameter of the anvil is chosen to accommodate the diameter of tubular workpiece 208. A tubular template 210 is mounted on the workpiece. The anvil has a vertical opening 212. A die button 214 is pressfitted in the upper end of the opening. Button 214 has a central opening 216.

The anvil can be replaced by another anvil having a larger punch opening. Similarily the die button can be replaced to accommodate a larger punch.

Referring to FIG. 4, drive means 216 mounted on the base, has a rotatable output shaft 218. An eccentric 220, carried on the shaft, is connected to a slideably mounted actuator 222. A punch holder 224 is connected to the actuator by means 226. The punch holder is slideably mounted in the base and has an opening 230 for supporting a punch 232. Fastener 234 provide means for locking the punch in opening 230. The lower end of the punch is narrowed at 236 so as to be receivable in the opening in drive button 210.

An adjustably mounted stripper 240 is mounted beneath the punch holder above the anvil and has an opening 242 for receiving the lower end of the punch.

The punch is positioned above the anvil a distance greater than the thickness of the workpiece 208, but less than the combined thickness of workpiece 208 and template 210. The stripper is positioned above the template in such a manner that as the punch is lowered, the punch removes a portion of the workpiece which is dropped down into opening 212. As the punch is raised, the stripper strips the workpiece and the template from the punch and also functions to obviate chattering. As the template and the workpiece are rotated by the user, the punch progressively shapes the workpiece so that it conforms to the edge of the template.

It is to be understood that a flat workpiece clamped together with a flat template (not shown) can also be nibbled to conform to the shape of the template by inserting the template in the workpiece between the stripper bar and the anvil. As in the embodiment illustrated in FIGS. 1 to 3, drive means 216 produces several nibbling cycles per second.

Having described my invention, I claim:

1. Apparatus for nibbling the edge of a tubular workpiece having a first wall thickness, comprising:
   a base;
   an anvil;
   means mounting the anvil on the base;
   a die mounted on the anvil, the die having a punch-receiving opening defining a first cutting edge;
   the anvil being receivable in the workpiece such that it is supported thereon;
   a tubular template telescopically mounted on the tubular workpiece so as to be movable therewith, the template having a second wall thickness and an edge having a predetermined configuration;
   the workpiece and the template being movable with respect to the anvil;
   a punch member having a second cutting edge, and means on the base supporting the punch member such that it is movable in a first direction toward the die opening in a cutting motion, and in the opposite direction to a return position defining an opening between the die and the punch member for receiving the workpiece wall in a cutting position in which the punch member is spaced from the die a distance greater than the first wall thickness of the tubular workpiece but less than the combined thickness of the template wall and the workpiece wall such that the template edge is engageable with the punch member in its cutting motion; and
   drive means for reciprocating the punch member with respect to the anvil to nibble the edge of the workpiece;
   whereby the punch member is operable to nibble an edge in the workpiece corresponding to the edge of the template as the template edge engages the punch member in its cutting motion.

2. Apparatus as defined in claim 1, including a stipper member on the base, the stripper member having an opening for receiving the punch member to strip the workpiece and the template from the punch member as it is being moved toward said return position.

3. Apparatus as defined in claim 1, in which the die is removable from the anvil to substitute a die having a larger punch-receiving opening.

4. Apparatus as defined in claim 1, in which the anvil is removable from the base to accommodate a substitute anvil.

5. Apparatus as defined in claim 1, in which the part nibbled from the workpiece is adapted to be dropped through the punch-receiving opening.

* * * * *